United States Patent
Liardet et al.

(10) Patent No.: US 7,783,691 B2
(45) Date of Patent: Aug. 24, 2010

(54) SHARING OF A LOGIC OPERATOR HAVING A WORK REGISTER

(75) Inventors: Pierre-Yvan Liardet, Peynier (FR); William Orlando, Peynier (FR)

(73) Assignee: STMicroelectronics S.A., Montrouge (FR)

( * ) Notice: Subject to any disclaimer, the term of this patent is extended or adjusted under 35 U.S.C. 154(b) by 867 days.

(21) Appl. No.: 11/585,658

(22) Filed: Oct. 24, 2006

(65) Prior Publication Data

US 2007/0220074 A1  Sep. 20, 2007

Related U.S. Application Data

(63) Continuation of application No. 10/619,105, filed on Jul. 14, 2003, now abandoned.

(30) Foreign Application Priority Data

Jul. 17, 2002  (FR) .................................. 02 09072

(51) Int. Cl.
*G06F 7/00* (2006.01)

(52) U.S. Cl. ..................................................... 708/200

(58) Field of Classification Search .................. 708/200
See application file for complete search history.

(56) References Cited

U.S. PATENT DOCUMENTS

| 5,475,822 A | 12/1995 | Sibigtroth et al. |
| 5,608,801 A * | 3/1997 | Aiello et al. .................. 380/46 |
| 5,666,300 A | 9/1997 | Adelman et al. |
| 6,434,584 B1 | 8/2002 | Henderson et al. |
| 2001/0037427 A1 | 11/2001 | Ogawa et al. |
| 2004/0032347 A1 * | 2/2004 | Yamazaki ..................... 341/50 |

OTHER PUBLICATIONS

French Search Report from French Patent Application 02/09072, filed Jul. 17, 2002.

* cited by examiner

*Primary Examiner*—Tan V Mai
(74) *Attorney, Agent, or Firm*—Lisa K. Jorgenson; James H. Morris; Wolf, Greenfield & Sacks, P.C.

(57) ABSTRACT

A circuit for calculating a discriminating function with successive iterations and with a work register on data divided into blocks, including: a single operator in wired logic for executing the function; a plurality of work registers sharing the operator; and an element for selecting one of the work registers to be associated with the operator.

16 Claims, 1 Drawing Sheet

SHARING OF A LOGIC OPERATOR HAVING A WORK REGISTER

RELATED APPLICATION

This application is a continuation of prior application Ser. No. 10/619,105, filed on Jul. 14, 2003, entitled SHARING OF A LOGIC OPERATOR HAVING A WORK REGISTER, which application is incorporated herein by reference in its entirety.

BACKGROUND OF THE INVENTION

1. Field of the Invention

The present invention generally relates to the processing of binary words by calculation functions. The present invention more specifically relates to the execution, by a state machine in wired logic of an integrated circuit, of a calculation representing a function capable of being used by several applications within this same circuit.

2. Discussion of the Related Art

An example of application of the present invention relates to the implementation, within the same circuit, of several processings all using a same operating function. For example, it may be a public key signature processing, a data integrity control or a random generator for cryptography. In all the above cases, a so-called "Hash" discriminating function is generally used, for example, functions known as SHA, MD5, etc.

Most of these discriminating functions are based on an iterative processing of a message divided into blocks taking into account the result of the previous iteration. They thus generally use a single work register which is updated at each iteration and forms, at the function end, an output register providing the desired result (calculated signature, integrity control authentication code, or random bit train) to be exploited by the rest of the circuit.

It would be desirable, for miniaturization, to be able to share a same logic operator for several processings exploiting a same function.

However, this poses several problems due to the very nature of the functions to which the present invention applies.

A first problem is linked to the existence of a work register storing the results of the different iterations. Indeed, this means in practice that the result of the functions is only obtained at the end of the multiple iterations.

A solution would consist of having interrupts generated by other applications wait until the iteration calculation is over. This is however incompatible with a desire of real time execution required by some applications needing the operator. For example, in the context of an integrity control requiring the discrimination operator for an authentication message calculation, it cannot be awaited until the operator is freed by another application.

It could also have been devised to store an intermediary state of an interruptible application to leave the work register and the operator available for another priority-holding application. However, a storing operation followed by a restoring of the states of the work register associated with the operator adversely affects the system performances and weakens it as concerns security against possible piracies of the handled quantities.

In practice, the only acceptable conventional solution when several applications (signature, integrity, random number generation) must use a Hash-type discrimination function, is to provide as many circuits (operator+register) as there are applications.

SUMMARY OF THE INVENTION

The present invention aims at providing a solution to the problem of the sharing of a logic operator by several applications exploiting a same iterative discrimination function.

The present invention also aims at providing a solution which is compatible with the desired miniaturization of integrated circuits.

The present invention also aims at enabling sharing of the operator in wired logic without adversely affecting the need for real time processing of a priority-holding application.

To achieve these and other objects, the present invention provides a circuit for calculating a discriminating function with successive iterations and with a work register on data divided into blocks, comprising:
  a single operator in wired logic for executing the function;
  a plurality of work registers sharing said operator; and
  an element for selecting one of the work registers to be associated with the operator.

According to an embodiment of the present invention, each register stores a current state of the operator and the rank of the corresponding iteration.

According to an embodiment of the present invention, said function is a Hash function.

According to an embodiment of the present invention, a multiplexer forming the selection element is controlled by a priority decoder associated with an integrated processor containing said calculation circuit.

The foregoing objects, features and advantages of the present invention will be discussed in detail in the following non-limiting description of specific embodiments in connection with the accompanying drawings.

DETAILED DESCRIPTION

Figure 1:
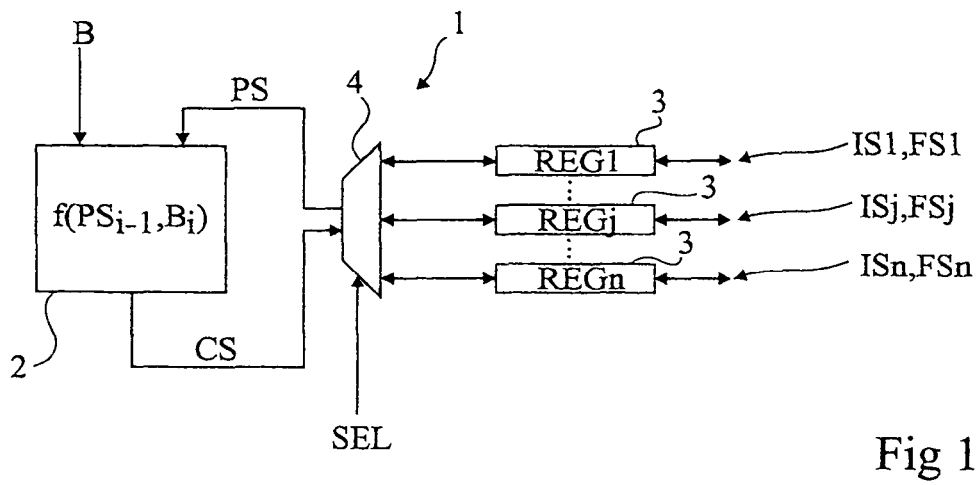
FIG. 1 very schematically shows in the form of blocks an embodiment of the circuit for calculating a discrimination function according to the present invention.

For clarity, only those steps and those elements which are necessary to the understanding of the present invention have been shown in the drawings and will be described hereafter. In particular, the exploitation made of the calculations by the discrimination function have not been described in detail. Furthermore, the present invention applies whatever the application requiring use of the wired operator. Further, the other components of an integrated circuit containing the calculation circuit of the present invention are conventional and have not been described.

A feature of the present invention is to dissociate, in a calculation circuit implementing an iterative discriminating function with a work register, the actual operator from the work register. According to the present invention, it is provided to share the operator between several work registers individually dedicated to different applications.

FIG. 1 very schematically shows in the form of blocks an embodiment of a shared calculation circuit according to the present invention.

Circuit 1 comprises a logic operator 2 (f(PSi−1, Bi)) executing an operation using as operands a binary block B and a state PS representing the result of the operation at a previous iteration.

The processed data (in the example of FIG. 1, block B) forms a portion of a data word for which an application requires use of the discriminating function.

The previous state $PS_{i-1}$ combined by logic state machine 2 with current block Bi is initialized at the beginning of an iteration by an initial value IS, and corresponds after the last iteration of the discriminating function to final result FS required by the application.

Up to this point, what has been described corresponds to a wired operator of a conventional discriminating function. For example, it may be a so-called Hash function.

According to the present invention, the input (PS) and the output (CS) states of operator 2 correspond to the successive contents of a single work register per application.

However, as many work registers 3 (REG1, ..., REGj, ... REGn)) as there are applications to share circuit 1 are provided.

Each register 3 is equivalent to a conventional work register associated with a wired operator 2. However, according to the present invention, inputs/outputs of registers 3 are connected to the multiple inputs of a multiplexer 4 having a single input/output connected to the input (signal PS)) of operator 2 and to the output (signal CS) of operator 2. Multiplexer 4 receives a selection signal (SEL) coming, for example, from a priority control (not shown) associated with the central processing unit of the processor integrating circuit 1.

Initial states IS1, ... ISj, ... ISn are loaded under control of the CPU into each register 3. The final states FS1, FSj, ... FSn of function f after the required iterations are read individually from each register, by the processor circuits having required the application of the Hash function to a given binary word.

Conventionally, number m of iterations depends on the number of data blocks to be processed. According to the present invention, number n of registers depends on the number of applications which require operator 2.

Figure 2:
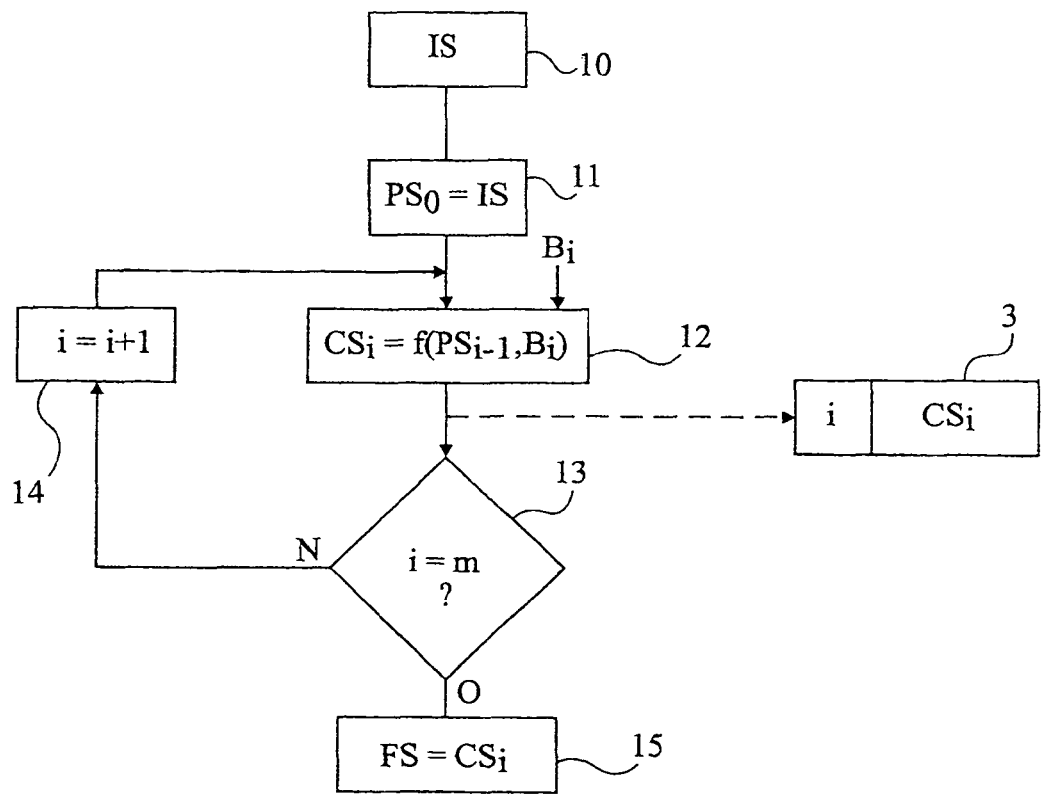
FIG. 2 is a flowchart of a function exploited by the calculation circuit of FIG. 1 according to an embodiment of the present invention.

FIG. 2 is a simplified flowchart of the function performed by operator 2.

The function starts (block 10, IS) from an initial state. This state is, in the example of FIG. 1, previously loaded into one of the work registers associated with the application having requested the function. In a specific example applied to a so-called SHA function, this initial state is predetermined.

The initial state becomes, when multiplexer 4 assigns operator 2 to the concerned register, first input value PS0 of the operator (block 11, PS0=IS).

The function of the logic operator is then executed (block 12, $CS_i = f(PS_{i-1}, B_i)$) on the first data couple, here the first data block to be processed B1 and the first input state PS0. This operation is repeated for the m data blocks to be processed. Accordingly, this amounts to testing (block 13, i=m?) the end of the data word to be processed. If the result is negative, the iteration rank is incremented (block 14, i=i+1) and operator f is executed again with as input values $PS_{i-1}$ and a new data block Bi. If the result is positive, output word $CS_i$ provided with the operator is considered as being the final state FS for the application having required the function.

According to the present invention, after each execution (block 12) of the operator, current state $CS_i$ and rank i of the iteration are stored in the concerned register. This feature of the present invention enables, in case the function is interrupted to make operator 2 available for a higher-priority application, to keep the current rank of the function to avoid restarting it from the beginning.

Of course, to implement the present invention, the data words to be processed by the discriminating function are also stored in adapted storage elements (for example, registers).

Rank i stored in register 3 assigned to the application is used to select the appropriate data block upon resumption of the iterations for the concerned application.

Generally, for the application to a Hash function, the data words are divided into blocks Bi of 512 bits each.

An advantage of the present invention is that it enables sharing a same operator in wired logic for several discriminating functions executed by different applications of an integrated processor.

Another advantage of the present invention is that by avoiding storage of the intermediary calculation states in an external memory of the integrated circuit, the present invention preserves the security character generally required for applications of discriminating functions.

Another advantage of the present invention is that its implementation is particularly simple in an integrated processor. In particular, the implementation of the present invention is compatible with the hardware circuits and control processes generally used in integrated processors. Further, the application processed by operator 2 is transparent for said operator, in that all operates as if it was only connected to one register.

According to a preferred example of application of the present invention, operator 2 is shared by several applications among which at least one real time data integrity control. In this case, this application is considered as holding the highest priority.

A second possible application may be a signature or authentication code calculation having a lower priority rank.

To hold the third priority rank, it may be provided to use operator 2 in the generation of a pseudo-random number which then holds the lowest priority rank.

Of course, the present invention is likely to have various alterations, modifications, and improvements which will readily occur to those skilled in the art. In particular, the practical forming of the calculation circuit according to the present invention is within the abilities of those skilled in the art based on the functional indications given hereabove. Further, the commands necessary to the multiplexer and to the different register by using conventional control means are within the abilities of those skilled in the art. Moreover, although this has not been described in detail, the selection of the block Bi assigned to the data word of the application may be performed in several manners. For example, the integrated circuit CPU manages the reading of the desired blocks according to the decided priorities.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A circuit for calculating a discriminating function by performing successive iterations on data divided into a plurality of data blocks using a work register, the circuit comprising:
   a single operator in wired logic for executing the discriminating function;
   a plurality of work registers sharing the operator, each work register from the plurality of work registers storing a current state of the operator and a rank of a corresponding iteration; and
   a selection element for selecting one of the work registers to be associated with the operator.

2. The circuit of claim 1, wherein the discriminating function is a Hash function.

3. The circuit of claim 1, wherein a multiplexer forming the selection element is controlled by a priority decoder associated with an integrated processor containing said calculation circuit.

4. The circuit of claim 3, wherein inputs/outputs of the plurality of work registers are connected to a plurality of inputs of the multiplexer.

5. The circuit of claim 4, wherein an input/output of the multiplexer is connected to an input and an output of the operator.

6. The circuit of claim 1, wherein each work register from the plurality of work registers is assigned to an application from a plurality of applications.

7. The circuit of claim 6, wherein the plurality of applications use the discriminating function.

8. The circuit of claim 1, wherein the operator executing the discriminating function performs acts comprising:
   executing a first iteration of the discriminating function on a first data block from the plurality of data blocks;
   determining whether an end of the data is reached;
   if it is determined than the end of the data is not reached:
      incrementing the rank of the corresponding iteration; and
      executing a second iteration of the function on a second data block from the plurality of data blocks; and
   if it is determined than the end of the data is reached, providing the current state of the operator as an output.

9. A method of calculating a discriminating function by performing successive iterations on data divided into a plurality of data blocks, the method comprising:
   sharing an operator for executing the discriminating function between a plurality of work registers;
   selecting a work register from the plurality of work registers to be associated with the operator; and
   after each execution of the discriminating function by the operator on a data block from the plurality of data blocks, storing, in the work register, a current state of the operator and a rank of a current iteration of the execution of the discriminating function.

10. The method of claim 9, wherein each work register from the plurality of work registers is assigned to an application from a plurality of applications.

11. The method of claim 10, wherein the plurality of applications use the discriminating function.

12. The method of claim 9, wherein the discriminating function is a hash function.

13. The method of claim 9, wherein a priority decoder associated with an integrated processor containing a calculation circuit performing the method controls a multiplexer that performs the selection of the work register.

14. The method of claim 13, wherein inputs/outputs of the plurality of work registers are connected to a plurality of inputs of the multiplexer.

15. The method of claim 13, wherein an input/output of the multiplexer is connected to an input and an output of the operator.

16. The method of claim 9, wherein the operator executing the discriminating function performs acts comprising:
   executing a first iteration of the discriminating function on a first data block from the plurality of data blocks;
   determining whether an end of the data is reached;
   if it is determined than the end of the data is not reached:
      incrementing the rank of the corresponding iteration; and
      executing a second iteration of the function on a second data block from the plurality of data blocks; and
   if it is determined than the end of the data is reached, providing the current state of the operator as an output.

* * * * *